Jan. 28, 1936.                G. WIRRER                 2,029,146
           WATER COOLING SYSTEM FOR INTERNAL COMBUSTION ENGINES
                           Filed Aug. 2, 1934
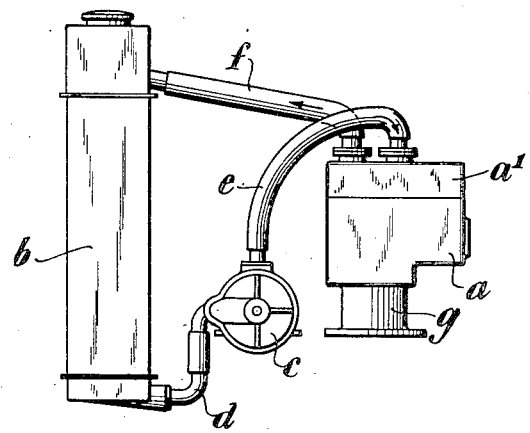
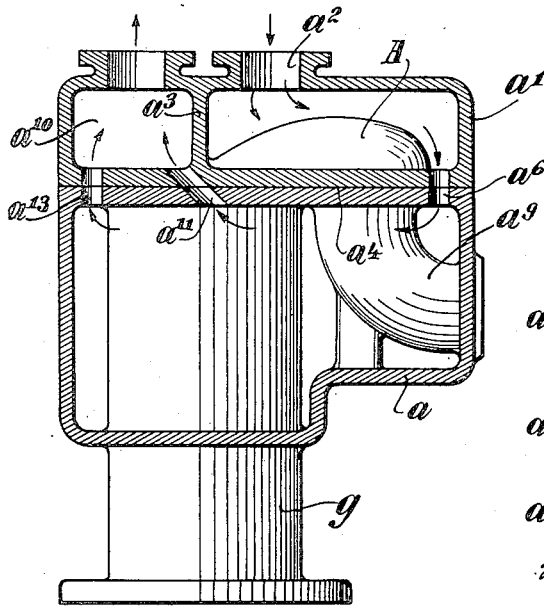
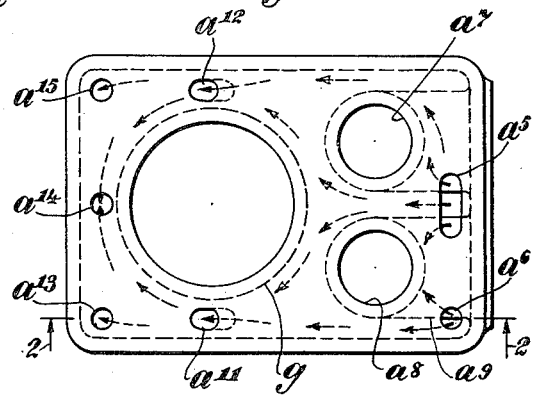
INVENTOR:
Gottfried Wirrer,
BY
Redding, Greeley, O'Shea & Campbell
HIS ATTORNEYS Patented Jan. 28, 1936

2,029,146

UNITED STATES PATENT OFFICE 2,029,146

WATER COOLING SYSTEM FOR INTERNAL COMBUSTION ENGINES

Gottfried Wirrer, Plainfield, N. J., assignor to International Motor Company, New York, N. Y., a corporation of Delaware Application August 2, 1934, Serial No. 738,071

4 Claims. (Cl. 123—173)

In the cooling of water jacketed internal combustion engines the primary consideration is to direct the water into intimate contact with the parts to be cooled and in sufficient volume to maintain the parts generally at the desired temperatures. In practice, different parts of the engine tend to rise to different temperatures and the hotter parts naturally require greater cooling. These considerations have not been effectively met by known structures. On the contrary, cooling systems in use are so constituted that the water is not so distributed within the jacket as to reach all of the parts in sufficient volume for effective cooling and this has been particularly true in respect of the valve ports and ducts, notably the exhaust duct and port. Heretofore, water has usually been introduced into the jacket of the cylinder block from whence it has passed through openings in the jacket to the cylinder head, passing thence back to the radiator. The course taken has resulted in robbing some of the parts of adequate cooling effect.

The principal object of the present invention is to provide an improved water cooling system in which the flow of the water through the jacketing is so controlled as to bring the water in adequate volume into intimate association with all of the parts to be cooled and to relate roughly the volume of water at different parts of the jacketing to the temperatures of the various parts. More particularly, it is an object of the invention to provide cooling means in which the water is introduced into the cylinder head from whence it is caused to flow into the cylinder jacket and to all portions thereof before reentering a section of the cylinder head for return flow to the radiator. A further object of the invention is to provide in a cooling system of the character indicated means whereby the direction of flow of the water through the jacket and the volume of water at different parts of the jacket may be roughly controlled so that the desired temperatures throughout may be maintained. This object is realized by means of the location and relative areas of the openings through which the water flows between the cylinder head and the cylinder block.

The invention will be described in connection with the preferred embodiment illustrated in the accompanying drawing, wherein:

Figure 1 is a schematic view showing the course taken by the cooling water between the radiator and the engine.

Figure 2 is a view in vertical section through the water jacket of an engine and showing the general direction taken by the water in its travel, the section being taken on the plane indicated by the line 2—2 of Figure 3 and looking in the direction of the arrows.

Figure 3 is a view in plan of the engine shown in Figure 2, the head being removed.

For the purposes of this specification all of the parts illustrated are shown somewhat conventionally. In Figure 1 the jacketed part of a cylinder is indicated at $a$, a radiator at $b$, a water pump at $c$, a pipe connection between the radiator and water pump at $d$, a pipe connection between the pump and the cylinder head at $e$ and a return flow pipe between the cylinder head and radiator at $f$. The cylinder barrel $g$ is shown as extending down below the jacketed portion $a$. The cooling water is introduced directly into the jacketed cylinder head $a'$ through a suitable inlet port $a^2$. Within the cylinder head is provided a partiton $a^3$ forming two compartments or an equivalent effect might be obtained within required limits by means of a baffle plate. The water entering the cylinder head passes directly over the combustion chamber A and escapes through registering openings in the cylinder head and cylinder deck $a^4$ to enter the water jacket $a$ of the cylinder. As shown in Figure 3 one such opening $a^5$ somewhat elongated may be disposed at one end of the cylinder deck at about the mid-section and a smaller opening $a^6$ may be provided at one corner of the cylinder deck. The inlet port is indicated at $a^7$ and the exhaust port at $a^8$. Given this relationship of parts it is evident that the water from the cylinder head will flow into the cylinder jacket through the two openings $a^5$, $a^6$, the latter being disposed in proximity to the exhaust port $a^8$ which is one of the hotter parts of the engine. In Figure 2 the exhaust duct is indicated at $a^9$. From the opening $a^5$ the water will flow between the exhaust duct $a^9$ and an inlet duct communicating with the inlet port $a^7$ and will also flow laterally taking paths around these two ducts. In order to bring a larger volume of water into contact with the exhaust duct $a^9$ the opening $a^6$ is provided from whence the additional volume flows directly to the exhaust duct $a^9$. The stream of water flowing between the inlet and exhaust ducts necessarily divides and flows around the cylinder barrel $g$. The water from the opening $a^6$ after passing the exhaust duct will commingle with this stream at one side of the cylinder barrel while some of the water which flows around the inlet will commingle with the stream at the other side of the jacket. All of the water from the cylinder jacket is then led back to the separate compartment $a^{10}$ in the cylinder head formed by the partition $a^3$. As shown in Figure 3 there are provided several openings in the cylinder deck through which the water passes into the compartment $a^{10}$. For instance, two openings $a^{11}$, $a^{12}$, are provided at opposite sides of the cylinder barrel $g$ through which some of the water may flow and other openings $a^{13}$, $a^{14}$, $a^{15}$, are provided near the extreme end of the cylinder deck in spaced relationship, one of the openings $a^{14}$ being centrally disposed at the far side of the cylinder barrel. By this relationship of openings it is insured that some water will circulate to every portion of the jacket before returning to the compartment $a^{10}$ in the cylinder head. By controlling the location of the several openings in the cylinder deck and also their relative areas it will be evident that the volume of water passing to the different parts of the cylinder jacket may be roughly controlled in accordance with the requirements. From the compartment $a^{10}$ the water flows through the return pipe $f$ to the radiator $b$.

From the description given it will be apparent that variations in the dimensions and relationship of parts and openings may be made to meet the requirements of the particular engine to be cooled without departing from the essential principles responsible for the improved cooling to be obtained by the invention.

I claim as my invention:

1. In an internal combustion engine having a jacketed cylinder head and a jacketed cylinder, a combustion chamber exposed to the interior of the cylinder, an inlet port in the cylinder head through which cooling water passes over the combustion chamber, inlet and exhaust ducts disposed within the cylinder jacket, registering openings in the cylinder head and cylinder jacket remote from said inlet port through which water passes from the cylinder head to the cylinder jacket, one of said openings being disposed in proximity to the exhaust duct and adjacent one side thereof, other registering openings in the cylinder jacket and cylinder head through which the water passes from the cylinder jacket back into the cylinder head, said openings being remote from the first named openings, a discharge port in the cylinder head for the water, and means separating the inlet and discharge ports to cause cooling water to flow through the aforesaid openings.

2. In an internal combustion engine having a jacketed cylinder head and a jacketed cylinder, a combustion chamber exposed to the interior of the cylinder, an inlet port in the cylinder head through which cooling water passes over the combustion chamber, inlet and exhaust ducts disposed within the cylinder jacket, registering openings in the cylinder head and cylinder jacket remote from said inlet port through which water passes from the cylinder head to the cylinder jacket, one of said openings being disposed in proximity to the exhaust duct and adjacent one side thereof, other registering openings in the cylinder jacket and cylinder head through which the water passes from the cylinder jacket back into the cylinder head, said openings being remote from the first named openings, some of said last named openings being disposed adjacent sides of the cylinder barrel opposite from the first named openings and being spaced about the barrel to cause the water to flow substantially uniformly thereabout, a discharge port in the cylinder head for the water, and means separating the inlet and discharge ports to cause cooling water to flow through the aforesaid openings.

3. In an internal combustion engine having a jacketed cylinder head and a jacketed cylinder, a combustion chamber exposed to the interior of the cylinder, an inlet port in the cylinder head through which cooling water passes over the combustion chamber, inlet and exhaust ducts disposed within the cylinder jacket, registering openings in the cylinder head and cylinder jacket remote from said inlet port through which water passes from the cylinder head to the cylinder jacket, one of said openings being disposed in proximity to the exhaust duct and adjacent one side thereof, and another being disposed in proximity to the exhaust duct and upon a side thereof spaced from the last named opening and from the inlet duct, the number and size of said openings being such that a greater flow of water about the exhaust duct takes place than about the inlet duct, other registering openings in the cylinder jacket and cylinder head through which the water passes from the cylinder jacket back into the cylinder head, said openings being remote from the first named openings, a discharge port in the cylinder head for the water, and means separating the inlet and discharge ports to cause cooling water to flow through the aforesaid openings.

4. In an internal combution engine having a jacketed cylinder head and a jacketed cylinder, a combustion chamber exposed to the interior of the cylinder, an inlet port in the cylinder head through which cooling water passes over the combustion chamber, inlet and exhaust ducts disposed within the cylinder jacket, registering openings in the cylinder head and cylinder jacket remote from said inlet port through which water passes from the cylinder head to the cylinder jacket, one of said openings being disposed in proximity to the exhaust duct and adjacent one side thereof, other registering openings in the cylinder jacket and cylinder head through which the water passes from the cylinder jacket back into the cylinder head, said openings being remote from the first named openings, some of said last named openings being disposed adjacent sides of the cylinder barrel opposite from the first named openings and being spaced about the barrel to cause the water to flow substantially uniformly thereabout, a discharge port in the cylinder head for the water, and means separating the inlet and discharge ports to cause cooling water to flow through the aforesaid openings.

GOTTFRIED WIRRER.